Jan. 4, 1938. M. G. VASS 2,104,249
MANUFACTURE OF EXPANDED METAL
Filed Feb. 9, 1935 6 Sheets-Sheet 3

Jan. 4, 1938.    M. G. VASS    2,104,249
MANUFACTURE OF EXPANDED METAL
Filed Feb. 9, 1935    6 Sheets-Sheet 4

Jan. 4, 1938. M. G. VASS 2,104,249
MANUFACTURE OF EXPANDED METAL
Filed Feb. 9, 1935 6 Sheets-Sheet 6

Patented Jan. 4, 1938

2,104,249

UNITED STATES PATENT OFFICE 2,104,249

MANUFACTURE OF EXPANDED METAL

Michael G. Vass, Maywood, Ill., assignor to United States Gypsum Company, Chicago, Ill., a corporation of Illinois Application February 9, 1935, Serial No. 5,824

53 Claims. (Cl. 164—6.5)

This invention relates to the production of expanded metal and has special reference to a method for producing flat expanded metal in which all the bonds and strands lie in substantially the same plane.

More particularly this invention relates to a method of producing flat expanded metal, such, for instance, as may be used for shelves, grills, guards and a great many other purposes where a flat surface is desirable. In expanding sheets of slitted metal for such uses particular attention must be paid to the formation of a sheet in which the meshes are of uniform size, shape and position.

In methods of expanding metal heretofore employed to produce sheets of flat expanded metal, little stress has been laid upon the uniformity of the meshes. One of the objects of my invention is to provide a method by which a sheet of slitted metal may be simply and quickly expanded to produce a finished sheet in which the meshes are all of uniform size, shape and position, and, in which if desired, the entire method may be carried out continuously.

A further object is to provide a method such that throughout the process a minimum of strain is exerted on any part of the sheet, which leads to the production of a stronger and more perfectly finished product.

A further object of my invention is to provide a method of producing flat expanded metal in which the expanded metal can be produced much more rapidly than heretofore.

Two types of apparatus which may be used to carry out the present method are shown in the accompanying drawings in which.

Fig. 7 is a top plan view of a sheet of slitted metal, showing the partial expansion thereof such as occurs as it passes through the separating dies;

In carrying out the present invention a sheet of metal is slitted to form strands and bonds, partially expanded to separate the bonds from each other, transversely corrugated, expanded to substantially the full width of the finished sheet and then flattened to bring all the strands and bonds into substantially the same plane. The method may be carried out continuously on a single machine or the various steps may be performed independently of the rest on separate pieces of apparatus.

Figure 1:
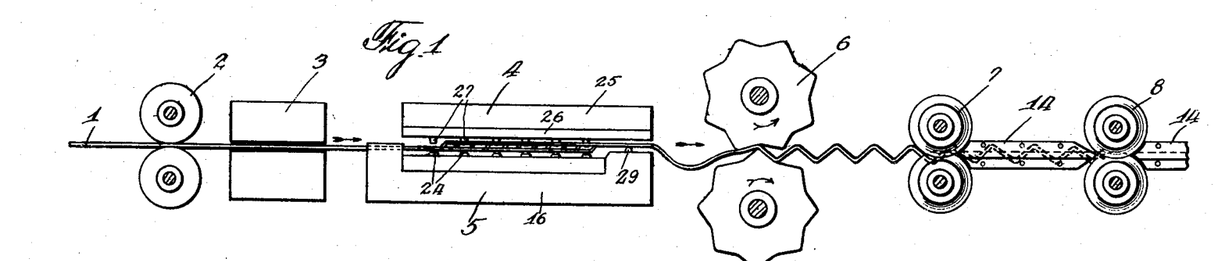
Figure 1 is a diagrammatic side elevational view, showing the front portion of apparatus which may be used to carry out my improved method.

Referring to Figure 1, the machine therein shown for treating a sheet of metal 1 to produce the finished product comprises a pair of feed rollers 2 for advancing the sheet 1 to reciprocating cutters 3 which slit the strip of metal longitudinally of the sheet in staggered break-joint relation, to provide strands 1a and bonds 1b (Fig. 7). Although a reciprocating cutter is shown, any other type of cutter, such as a rotary cutter may be employed, which will slit the sheet in substantially the same manner, such as is shown in Fig. 7. From the cutter the slitted sheet is preferably advanced to apparatus which serves to separate the bonds to some extent. The apparatus shown in the drawings for accomplishing this comprises a pair of reciprocating dies or jaws 4 and 5, shown more particularly in Figs. 3, 4, 5 and 6. These dies serve to partially expand the sheet, leaving the bonds and strands in substantially a common plane after they have passed completely through the dies, so that this partially expanded sheet may be described as flat. Other forms of apparatus for accomplishing substantially the same result may be employed. While in Fig. 7 the partially expanded sheet is shown with the bonds separated a substantial distance, this may not be necessary, the purpose being merely to separate the bonds a sufficient distance to permit the expanding mechanism to be inserted between adjacent bonds. In some cases it is possible to omit this preliminary expanding step, such as where the expanding mechanism is provided with a knife edge which can be forced between adjacent bonds. This, however, has not proved as satisfactory as a method which includes the step of slightly separating the bonds and sheets.

The slightly expanded sheet is next fed between corrugating apparatus which may comprise a pair of corrugating rolls 6. Instead of the corrugating rolls other forms of apparatus which will corrugate the sheet transversely of the slits therein may be employed.

Figure 2:
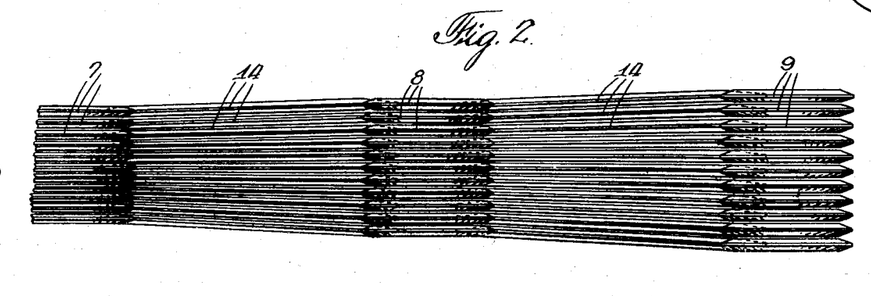
Fig. 2 is a top plan view of a portion of the expanding mechanism showing pairs of feed rolls with expanding guides therebetween.
Figure 3:
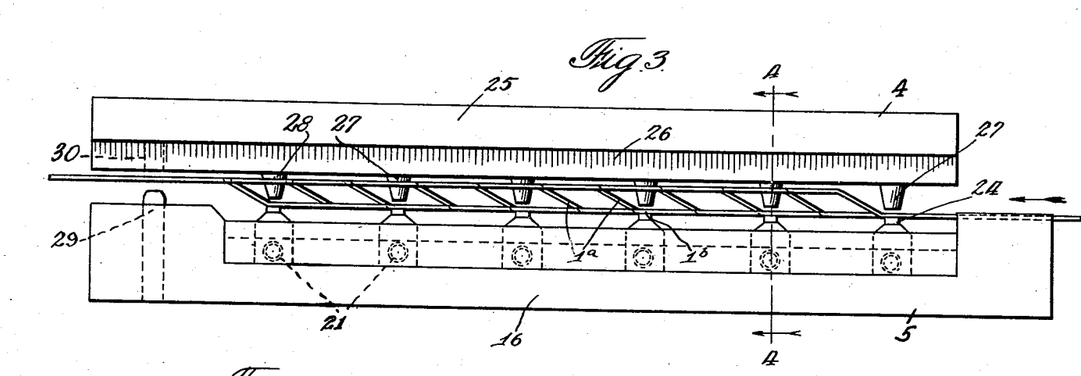
Fig. 3 is a side elevational view of the separating dies.
Figure 4:
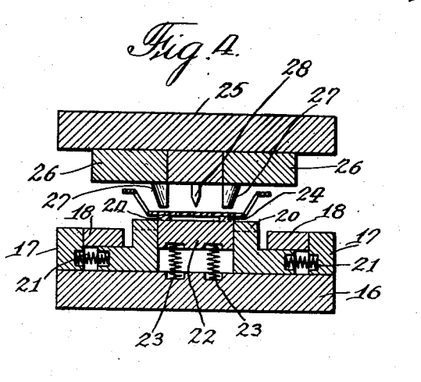
Fig. 4 is a vertical cross-sectional view taken on the line 4—4 of Fig. 3, with the dies in separated position.
Figure 5:
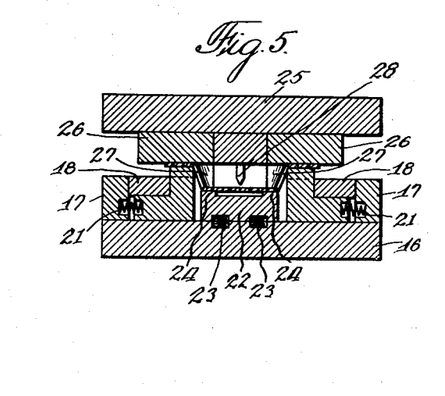
Fig. 5 is a view similar to Fig. 4, showing the dies forced together.
Figure 8:
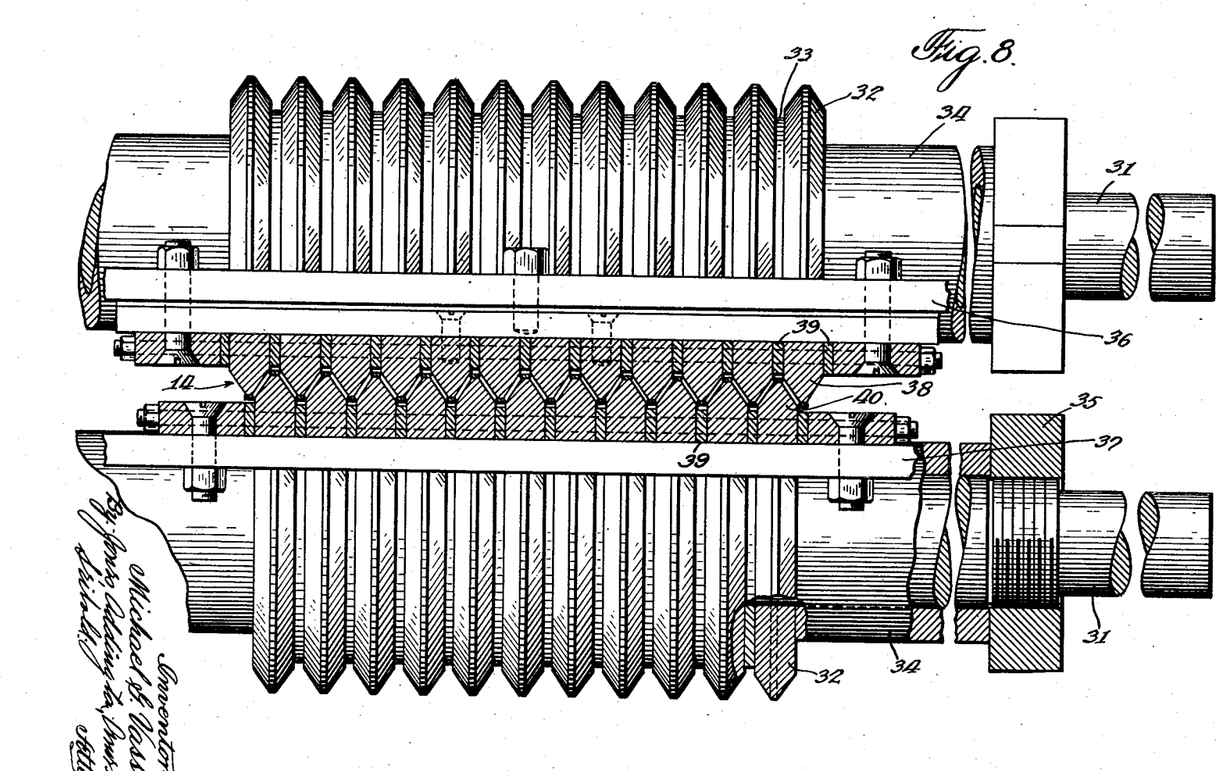
Fig. 8 is a cross-sectional view through one set of expanding guides, showing a pair of feed rolls cooperating therewith.

From the corrugating means the transversely corrugated partially expanded sheet is fed to the expanding apparatus proper. This may comprise a series of feed rolls 7, 8, 9, 10, 11, 12 and 13 and a plurality of sets of diverging guiding means 14 for feeding the material from one set of feed rolls to the next. These rolls, as shown in Figs. 2 and 8, are provided with intermeshing corrugated surfaces, the peripheries of which engage the spaces between adjacent bonds in the transverse rows. The size of the corrugations in each pair of rolls is such that there will be frictional contact between the rolls and the sheet passing therethrough. This provides the necessary engagement of the rolls with the sheet to feed the same and may, incidentally, expand the sheet to some extent. From the feed rolls 7 the sheet is fed to a set of diverging expanding guiding means 14, shown particularly in cross section in Fig. 8. These guides preferably form longitudinally extending channels which appear corrugated in cross section. The shape of the corrugations at the receiving end of each set of expanding guides is substantially the same as that of the intermeshing feed rolls supplying the sheet thereto, and each succeeding pair of guide rolls forms a channel of substantially the same shape and size as the discharge end of the preceding set of expanding guides. The channels of the expanding guides, due to the divergence thereof, exert a transverse push against adjacent bonds and substantially continuously force them apart. As each succeeding set of expanding guides serves to widen the sheet further than the preceding guides, any number of feed rolls 7 to 13 and expanding guiding mechanisms therebetween may be employed. It is preferable that the transverse separation of the bonds, whether performed by the apparatus shown or other apparatus which serves to simultaneously transversely separate adjacent bonds, be gradual so as to put as little strain as possible upon the sheet of metal being expanded and at the same time prevent distortion of the meshes formed. By exerting transverse pressure on the individual bonds in each transverse row the expansion will be uniform so that the completed meshes will be of the same size, shape and position.

Figure 9:
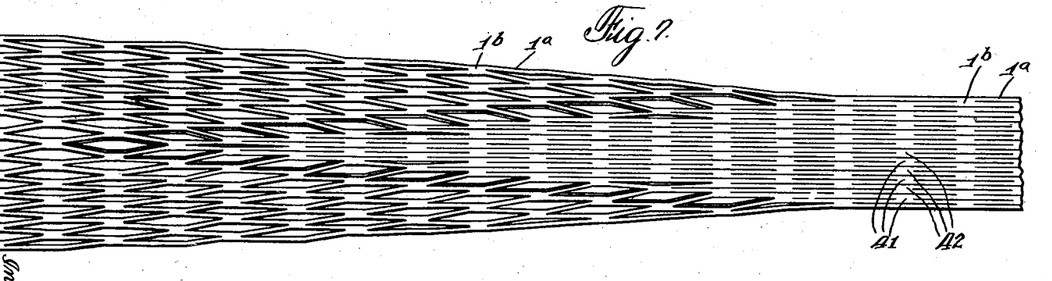
Fig. 9 is a fragmentary top plan view of a sheet as it appears while undergoing the final steps in the expansion.
Figure 10:
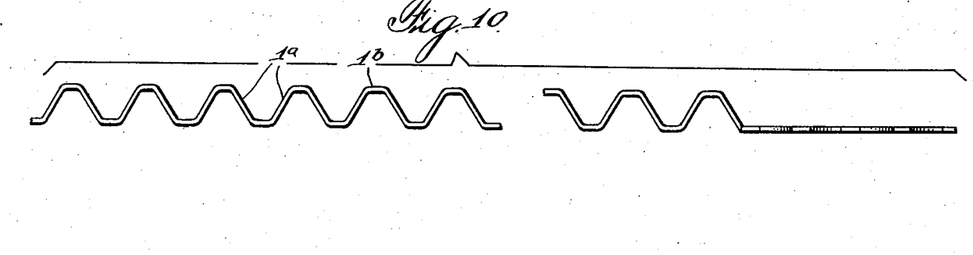
Fig. 10 is a fragmentary side elevational view of the sheet shown in Fig. 9.
Figure 11:
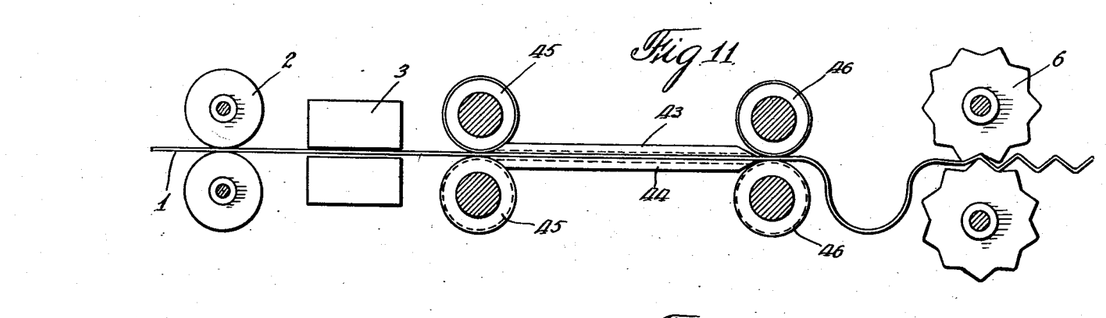
Fig. 11 is a diagrammatic elevational view of another form of apparatus for giving the initial expansion to the slitted metal.

From the last set of feed rolls 13 the expanded corrugated sheet is fed between flattening means such as the flattening rolls 15 which bring the bonds and strands into substantially the same plane, thereby producing the finished sheet of expanded metal as shown in Figs. 9 and 10.

Considering the apparatus more in detail, the separating dies 4 and 5 may be constructed as shown in Figs. 3 to 6. The bottom die may comprise a stationary base plate 16 having upwardly extending side portions 17 with inwardly extending flanges 18 adjacent the upper portions thereof. The flanges 18 with the base 16 and sides 17 form channels in which may be positioned longitudinally extending right angled members 20 which may move transversely in the slots. Resilient means, such as coil springs 21, are provided between the side portion 17 and the right angled members 20 which tend to hold the right angled members 20 toward the center of the die. Positioned between the right angled members 20 is a floating base or lower jaw 22 mounted on resilient means, such as coil springs 23, which serve normally to hold the floating base in a position in which the upper end thereof projects slightly above the upper surface of the right angled members 20. With this construction of the lower die, the floating base 22 may be moved vertically while the right angled members 20 may be moved transversely. On each side of the upper surface of the floating jaw member 22 are preferably provided a set of projecting tooth portions 24.

Figure 6:
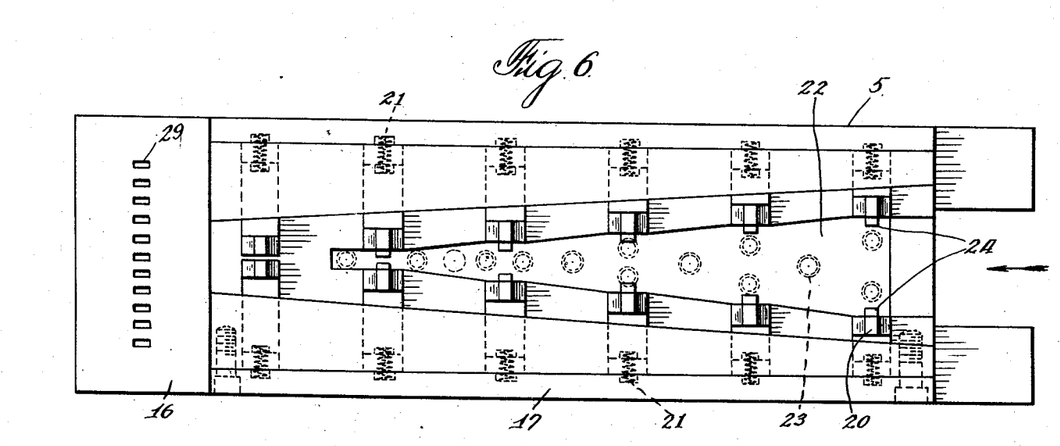
Fig. 6 is a top plan view of the lower separating die.

As shown particularly in Fig. 6, the floating base 22 is gradually narrowed step by step so that the first set of projecting members 24 engages the two bonds lying adjacent the outermost bonds and the next pair of projecting members will engage the next two inner bonds and so on, by which means the sheet is preliminarily expanded, beginning with the two outside bonds, as hereinafter explained.

The upper die or jaw member preferably moves as a unit and comprises a base 25 having longitudinally extending members 26 secured thereto. Projecting downwardly from the longitudinal members 26 are pairs of teeth 27 which taper outwardly and upwardly. The reduced portion of the teeth 27 are positioned directly above the projecting tooth portions 24 of the floating base or lower jaw 22.

Adjacent the discharge end of the upper die there is provided a pin or wedge 28 which serves to open the center mesh of the sheet. In operation the sheet is fed into the separating dies so that the first two outer bonds lie just outside of the first two projecting tooth members 24, the pair of next inwardly positioned bonds lying on the top of the first pair of projections 24. The upper die member is then lowered to the position shown in Fig. 5 from that shown in Fig. 4. When this is done the tapered upper teeth 27 engage the bonds lying on top of the lower teeth 24 and move the floating base 22 downwardly. Due to the taper of the teeth 27, when the tapered surface thereof engages the inner side of the slidable right angled supporting members 20, the latter are moved outwardly and the outer pair of bonds is forced outwardly by the tapered edge of the teeth 27 to the position shown in Fig. 5. Thus the expanded portion of the sheet which is adjacent the outside thereof lies in a plane substantially parallel to and above the original plane of the sheet. After the first two outermost bonds have been moved upwardly and outwardly with respect to the rest of the sheet, the sheet is advanced until the next pair of bonds lies outwardly of the next pair of projecting members 24, and the die is again brought together. By this means the entire sheet is expanded except for the center mesh which is expanded by the wedge pin 28.

In the lower die, beyond the pin 28, there is positioned a transverse row of spacing projections 29 which, when the expanded sheet is positioned thereunder and the dies again brought together, serves to properly space the partially open meshes. The upper die 25 is provided with a series of corresponding vertical depressions 30 into which the spacing projections 29 enter. The sheet therefore comes out of the separating dies as a partially expanded flat sheet.

The corrugating mechanism is shaped to corrugate the sheet in such a manner that alternate transverse rows of bonds will lie at the crests of the corrugations in the sheet and alternate transverse rows of bonds will lie at the depressions in the corrugated sheet. Thus, when the corrugated sheet is fed to the feed rolls and expanding guides the same will fit between the bonds of the transverse rows.

The sheet of metal is slitted to form strands 1a and bonds 1b. The sheet as it passes through the separating dies 4 and 5 is expanded, as shown in Fig. 7. As it progresses through the expanding guides and feed rolls after having been corrugated, the bonds are transversely separated as the sheet progresses and the meshes are opened until they reach their full width, as shown in Fig. 9. The flattening rolls then serve to bring all the bonds and strands in substantially the same plane which, at the same time, elongates the meshes by removing the corrugations, and produces the finished sheet.

The machine is provided with side members (not shown) having bearings therein in which the shafts of the feed rolls are mounted. The rolls 7 through 13 may be constructed as follows:

On shafts 31 there are mounted a plurality of annular discs 32 having the peripheries thereof tapered. Between each of the annular discs 32 there is positioned a spacing member 33. Considering each pair of rolls, the annular discs are positioned on the shaft so that the tapered peripheries of one of the rolls will fit between the tapered peripheries of the other roll and thereby provide a corrugated channel between the rolls of each pair. Beyond the outer annular discs of each roll there are mounted sleeves 34 which are held against the outer annular discs by nuts 35 threaded onto each end of shafts 31. Each pair of rolls is provided with the same number of annular discs and spacing members as every other pair of rolls. However, beginning with the first set of rolls 8, each succeeding set of rolls is provided with annular discs that are of greater width and in which the peripheral edges are provided with less acute angles.

Between the sides of the machine there are mounted transverse supporting bars 36 and 37. Extending downwardly from and attached to bar 36 is a plurality of spaced gradually diverging guides 38, the lower surfaces of which are tapered as shown in Fig. 8. Between each of the guides 38 are spacing members 39 which are of substantially the same width as the spacing members 33 employed in the rolls, both spacing members 33 and 39 being of substantially the same width as the width of the bonds in the sheet. Extending upwardly from the transverse bar 37 are other guides 40 of substantially the same shape as the guides 38 except that their tapered edges are uppermost. Spacers 39 are also provided between the guides 40. The guides 38 and 40 are arranged in staggered relation to provide a channel which in cross section appears corrugated. This channel is substantially the same shape as the space provided between the preceding pair of feed rolls. As the guides 38 and 40 gradually diverge the corrugated sheet of metal passing therethrough is gradually widened until the desired width is obtained.

The various elements of the machine shown in Figure 1, such as the feed rolls 2, corrugating rolls 6 and feed rolls 7 through 13 and flattening rolls 15 may be connected together by gears so as to advance the sheet at the same speed throughout the machine. Where reciprocating cutters and separating dies are employed the feeding is intermittent, although for the purposes of the present invention this may be considered as substantially continuously feeding the metal therethrough. During the time when the reciprocating cutters 3 and the reciprocating jaws 4 and 5 are operating on the material, the rotation of the feed rolls 2, corrugating rolls 6, feed rolls 7 to 13, incl., and flattening rolls 15 is suspended. This intermittent timed operation of the rolls with respect to the reciprocating parts may be accomplished by a ratchet and pawl mechanism well known in this art, as shown, for example in Fig. 5 of the patent to Clark No. 1,103,034, dated July 14, 1914, which patent shows intermittent timed operation of feed wheels with respect to reciprocating parts. The reciprocating cutters 3 and dies 4 and 5 are timed with the rest of the machine so that they are brought together while the sheet is stationary. In other words, all the elements of the machine are correlated so that the sheet is fed through substantially continuously.

The method, therefore, comprises slitting the sheet, partially expanding the sheet to produce a sheet in which the bonds and strands lie in substantially the same plane with the bonds slightly separated from each other. The next step is to corrugate the sheet transversely so that alternate transverse rows of bonds lie at the crests of the corrugations and intermediate transverse rows of bonds lie at the depressions of the corrugations. After the partially expanded sheet has been corrugated it is fed through expanding guides which progressively and gradually force the transverse bonds of transverse rows away from each other until the meshes have been opened to desired width. Thereafter, the completely widened corrugated sheet is flattened to bring the bonds and strands into substantially the same plane and produce the finished sheet wherein the meshes are uniform in size, shape and position.

Figure 12:
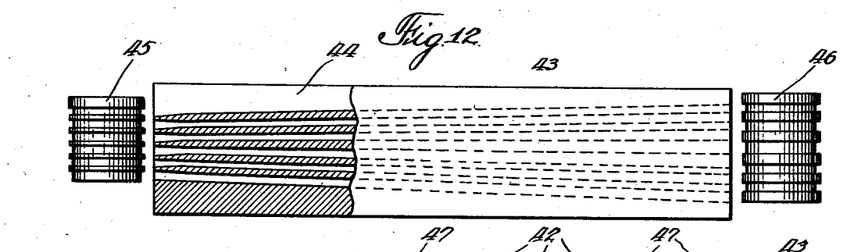
Fig. 12 is a plan view of the feed rolls and expanding guides of Fig. 11.
Figures 13, 14:
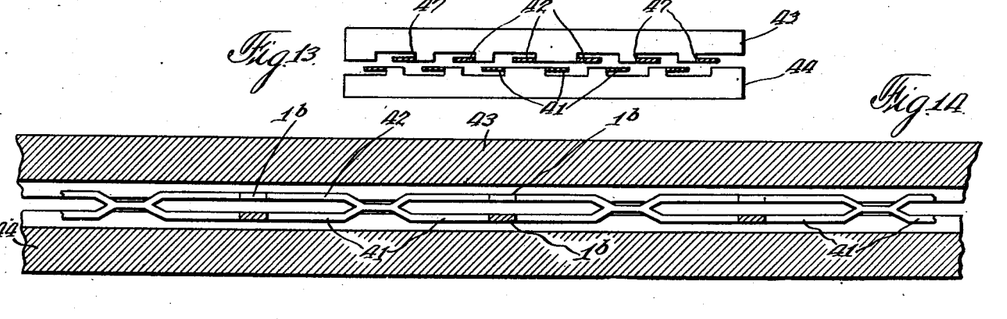
Fig. 13 is an end view of the expanding guides, showing the slitted sheet passing therebetween.
Fig. 14 is a longitudinal sectional view of a portion of a slitted sheet of metal passing along the guides.

In Figs. 11 to 14, incl., is shown a different form of apparatus for effecting the initial expansion. In this form, I make use of the offset portions of the sheet formed in the usual slitting operation by directing them through laterally diverging guide channels. As indicated in Figs. 7, 13 and 14, the slitting or shearing operation results in a plurality of series of longitudinally aligned offset portions, alternate offset portions 41 being offset downwardly and the intermediate portions 42 being offset upwardly. There is thus provided a plurality of series of longitudinally aligned offset portions which may be used for guiding the slitted sheet in such a way as to cause the different series to travel in diverging directions to expand the slitted material. The apparatus shown for this purpose comprises a pair of upper and lower grooved guide plates 43 and 44, respectively, lying between front and rear pairs of feed rolls 45 and 46, respectively, this apparatus being interposed between the slitting mechanism 3 and the corrugating mechanism 6. While the slitting mechanism here shown is of the reciprocating type, it is obvious that it might be possible to use a rotary type of cutter. If a rotary type of cutter were used, the sheet feed might be made continuous instead of step by step as required by the reciprocating cutter method. As shown in Figs. 13 and 14, the upper grooved guide plate provides guides for engaging the cut edges of the upwardly offset portions 42 of the slitted sheet and the lower grooved guide plate provides guides 47 for engaging the cut edges of the downwardly offset portions 41 of the slitted sheet.

Figure 1A:
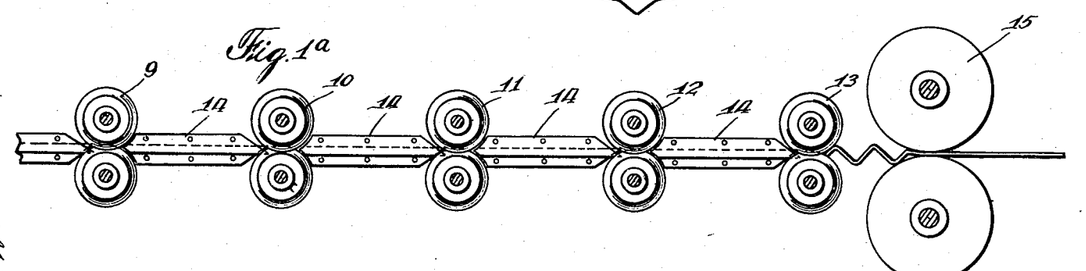
Fig. 1a is a diagrammatic side elevational view of the rear portion of the apparatus.

As shown in Fig. 12, these guides diverge gradually from front to rear so that the plurality of series of longitudinally aligned offset portions 41 and 42 are caused to travel in diverging directions to expand the slitted material. By means of this apparatus, the material may be given an initial expansion prior to the corrugating action of the corrugating rolls 6, so that after passing through the corrugating rolls the material will be expanded sufficiently to be handled by the rearward part of the mechanism shown in Figs. 1 and 1a, including the feed rolls 7, 8, 9, etc., and the diverging guiding means 14. The further expansion and flattening of the metal may be effected by the use of apparatus such as shown diagrammatically in Fig. 1a. For some uses of expanded metal the entire expanding action may be effected by the use of the flaring guides for the offset portions.

While various types of apparatus have been shown for carrying out the present method continuously other types of apparatus may be employed and it is not essential that the method be carried out continuously as it may be done by independent steps.

Further modifications will be apparent to those skilled in the art and it is desired, therefore, that the invention be limited only by the prior art and the scope of the appended claims.

Having thus described my invention, what I claim and desire to secure by Letters Patent is:

1. A method of expanding sheet material comprising slitting the material and providing it with a plurality of series of individually separated offset portions, some of said series being spaced a substantial distance from the side edges of the sheet, causing the sheet to travel and causing pressure to be exerted substantially laterally with respect to the sheet directly on offset portions of said plurality of series while the sheet is traveling to cause them to travel in laterally diverging directions to expand the slitted material.

2. A method of expanding sheet material comprising slitting the material and providing it with a plurality of series of offset portions having cut edges, some of said series being spaced a substantial distance from the side edges of the sheet, causing the sheet to travel and causing lateral pressure to be exerted on the cut edges of said plurality of series while the sheet is traveling to cause them to travel in laterally diverging directions to expand the slitted material.

3. A method of expanding sheet material comprising slitting the material and providing it with a plurality of series of individually separated offset portions, some of said series being spaced a substantial distance from the side edges of the sheet, causing the sheet to travel and causing lateral pressure to be exerted on said offset portions while the sheet is traveling to cause them to travel in laterally diverging directions to expand the slitted material.

4. A method of expanding sheet material comprising slitting the material and providing it with a plurality of series of offset portions having cut edges formed by the slitting operation, some of said series being spaced a substantial distance from the side edges of the sheet, causing the sheet to travel and causing lateral pressure to be exerted on the cut edges of said plurality of series while the sheet is traveling to cause them to travel in laterally diverging directions to expand the slitted material.

5. A method of expanding sheet material comprising slitting the material and providing it with a plurality of series of individually separated offset portions, some of said series being spaced a substantial distance from the side edges of the sheet, causing the sheet to travel and causing pressure to be exerted substantially laterally with respect to the sheet directly on offset portions of said plurality of series while the sheet is traveling to cause them to travel continuously in laterally diverging directions to expand the slitted material.

6. A method of expanding sheet material comprising slitting the material and providing it with a plurality of series of individually separated offset portions, some of said series being spaced a substantial distance from the side edges of the sheet, causing the sheet to travel and causing lateral pressure to be exerted on said offset portions while the sheet is traveling to cause them to travel continuously in laterally diverging directions to expand the slitted material.

7. A method of expanding sheet material comprising slitting the material and providing it with a plurality of series of offset individually separated aligned portions, some of said series being spaced a substantial distance from the side edges of the sheet, causing the sheet to travel and causing pressure to be exerted substantially laterally with respect to the sheet directly on offset portions of said plurality of series while the sheet is traveling to cause them to travel in laterally diverging directions to expand the slitted material.

8. A method of expanding sheet material comprising slitting the material and providing it with a plurality of series of offset individually separated longitudinally aligned portions, some of said series being spaced a substantial distance from the side edges of the sheet, causing the sheet to travel and causing pressure to be exerted substantially laterally with respect to the sheet directly on offset portions of said plurality of series while the sheet is traveling to cause them to travel in laterally diverging directions to expand the slitted material.

9. A method of expanding sheet material comprising slitting the material and providing it with a plurality of series of offset aligned portions having cut edges, some of said series being spaced a substantial distance from the side edges of the sheet, causing the sheet to travel and causing lateral pressure to be exerted on the cut edges of said plurality of series while the sheet is traveling to cause them to travel in laterally diverging directions to expand the slitted material.

10. A method of expanding sheet material comprising slitting the material and providing it with a plurality of series of offset aligned portions having cut edges formed by the slitting operation, some of said series being spaced a substantial distance from the side edges of the sheet, causing the sheet to travel and causing lateral pressure to be exerted on the cut edges of said plurality of series while the sheet is traveling to cause them to travel in laterally diverging directions to expand the slitted material.

11. A method of expanding sheet material comprising slitting the material to provide a plurality of transverse series of bonds and connecting strands with the bonds of one series in staggered relation with respect to the bonds of the adjacent series, corrugating the material to offset adjacent transverse series with respect to each other and separating the bonds of each series from each other by causing pressure to be exerted substantially laterally with respect to the sheet directly on the individual bonds.

12. A method of expanding sheet material comprising slitting the material to provide a plurality of transverse series of bonds and connecting strands with the bonds of one series in staggered relation with respect to the bonds of the adjacent series and with the bonds of alternating series in longitudinal alignment to provide a plurality of longitudinally aligned series of bonds and causing pressure to be exerted substantially laterally with respect to the sheet directly on said plurality of longitudinally aligned series to cause them to travel in laterally diverging directions to expand the slitted material.

13. A method of expanding sheet material comprising slitting and corrugating the material to provide it with a plurality of series of offset portions, some of said series being spaced a substantial distance from the side edges of the sheet, and causing pressure to be exerted on said plurality of series to cause them to travel in diverging directions to expand the slitted material.

14. A method of expanding sheet material comprising slitting and corrugating the material to provide it with a plurality of series of offset portions having cut edges, some of said series being spaced a substantial distance from the side edges of the sheet, and causing lateral pressure to be exerted on the cut edges of said plurality of series to cause them to travel in diverging directions to expand the slitted material.

15. A method of expanding sheet material comprising slitting and corrugating the material to provide it with a plurality of series of offset portions, some of said series being spaced a substantial distance from the side edges of the sheet, and causing pressure to be exerted on said plurality of series to cause them to travel in diverging directions by causing lateral pressure to be exerted on said offset portions to expand the slitted material.

16. A method of expanding sheet material comprising slitting and corrugating the material to provide it with a plurality of series of offset portions having cut edges formed by the slitting operation, some of said series being spaced a substantial distance from the side edges of the sheet, and causing lateral pressure to be exerted on the cut edges of said plurality of series to cause them to travel in diverging directions to expand the slitted material.

17. A method of expanding sheet material comprising slitting the material to provide a plurality of transverse series of bonds and connecting strands with the bonds of one series in staggered relation with respect to the bonds of the adjacent series, some of said series being spaced a substantial distance from the side edges of the sheet, corrugating the material to offset adjacent transverse series with respect to each other and separating the bonds of each series from each other by causing pressure to be exerted on the individual bonds, and thereafter flattening the corrugated and expanded metal.

18. A method of expanding sheet material comprising slitting the material to provide a plurality of transverse series of bonds and connecting strands with the bonds of one series in staggered relation with respect to the bonds of the adjacent series and with the bonds of alternating series in longitudinal alignment to provide a plurality of longitudinally aligned series of bonds, corrugating the material to offset adjacent transverse series with respect to each other, some of said series being spaced a substantial distance from the side edges of the sheet, and causing pressure to be exerted on said plurality of longitudinally aligned series to cause them to travel in diverging directions to expand the slitted material, and thereafter flattening the corrugated and expanded metal.

19. The method of expanding a sheet of metal slitted to form strands and bonds which comprises corrugating said sheet transversely of the slits therein, so that some of the bonds lie in one plane and others lie in another plane spaced from said first plane, separating said bonds by lateral movement in their respective planes to form openings of desired size, and flattening said expanded sheet to remove said corrugations.

20. The method of expanding a sheet of metal slitted to form strands and bonds which comprises separating said bonds, corrugating said sheet transversely of the slits, therein, so that some of the bonds lie in one plane and others lie in another plane spaced from said first plane, further separating said bonds by lateral movement in their respective planes to form openings of desired size, and flattening said expanded sheet to remove said corrugations.

21. The method of expanding a sheet of metal slitted to form strands and bonds which comprises separating said bonds, corrugating said sheet transversely of the slits therein, further separating said bonds to form openings of desired size by individually forcing adjacent bonds transversely away from each other, and flattening said expanded sheet to remove said corrugations.

22. The method of expanding a sheet of metal slitted to form strands and bonds which comprises corrugating said sheet transversely of the slits therein to bring transverse rows of bonds at the crests and depressions of said corrugations, separating said bonds to form openings of desired size by individually forcing adjacent bonds transversely away from each other, and flattening said expanded sheet to bring said bonds and strands into substantially the same plane.

23. The method of expanding a sheet of metal slitted to form strands and bonds which comprises corrugating said sheet transversely of the slits therein, so that some of the bonds lie in one plane and others lie in another plane spaced from said first plane transversely separating said strands and bonds gradually at various places throughout the width of said sheet to open the slits to desired size by individually forcing adjacent bonds transversely away from each other, and flattening said sheet to bring said strands and bonds into substantially the same plane.

24. The method of expanding a sheet of metal slitted to form strands and bonds which comprises separating said bonds, corrugating said sheet transversely of the slits therein, further transversely separating said strands and bonds by longitudinally passing said sheet through a plurality of spaced diverging expanding guiding means to progressively open said slits to desired size, and flattening said sheets to bring said strands and bonds into substantially the same plane.

25. The method of expanding a sheet of metal slitted to form strands and bonds which comprises separating said bonds to form a partially expanded sheet with the bonds and strands in substantially the same plane, corrugating said sheet transversely of the slits therein, further separating said bonds to form openings of desired size, and flattening said sheet to bring said strands and bonds into substantially the same plane.

26. The method of expanding a sheet of metal slitted to form strands and bonds which comprises separating said bonds while maintaining the same substantially parallel to the plane of the sheet to form a partially expanded sheet having the strands and bonds thereof in substantially the same plane, corrugating said partially expanded sheet transversely of the slits thereof, further separating said bonds to form openings of desired size, and flattening said sheet to bring said bonds and strands into substantially the same plane.

27. The method of expanding a sheet of metal slitted to form strands and bonds which comprises substantially continuously advancing said sheet, corrugating said sheet transversely of the slits therein, so that some of the bonds lie in one plane and others lie in another plane spaced from said first plane, gradually separating said bonds by lateral movement in their respective planes to form openings of desired size, and flattening said sheet to remove said corrugations.

28. The method of expanding a sheet of metal slitted to form strands and bonds which comprises substantially continuously advancing said sheet, separating said bonds, corrugating said sheet transversely of the slits therein, gradually separating said bonds to form openings of desired size, and flattening said sheet to remove said corrugations.

29. The method of expanding a sheet of metal slitted to form strands and bonds which comprises separating said bonds to form a partially expanded sheet with the bonds and strands in substantially the same plane, corrugating said sheet transversely of the slits therein to bring transverse rows of bonds at the crests and depressions formed by corrugating said sheet, progressively further separating said bonds to open said slits to desired size, and flattening said sheet to bring said bonds and strands into substantially the same plane.

30. The method of expanding a sheet of metal slitted to form strands and bonds which comprises separating the said bonds, corrugating said sheet transversely of the slits therein to bring transverse rows of bonds at the crests and depressions formed by corrugating said sheet, gradually and progressively further separating said bonds at the crests and depressions of said corrugations to open said slits to desired width, and flattening said sheet to bring said bonds and strands into substantially the same plane.

31. The method of expanding a sheet of metal slitted to form strands and bonds which comprises separating said bonds, corrugating said sheet transversely of the slits therein to bring transverse rows of bonds at the crests and depressions formed by corrugating said sheet, progressively and gradually urging adjacent bonds at said crests and depressions away from each other to open said slits to desired size, and flattening said sheet to bring said bonds and strands into substantially the same plane.

32. The method of expanding a sheet of metal slitted to form strands and bonds which comprises separating said bonds, corrugating said sheet transversely of the slits therein to bring transverse rows of bonds at the crests and depressions formed by corrugating said sheet, progressively and gradually urging adjacent bonds at said crests and depressions away from each other by longitudinally passing said sheet through longitudinally corrugated diverging expanding guiding means to open said slits to desired size, and flattening said sheet to bring said bonds and strands into substantially the same plane.

33. The method of expanding a sheet of metal slitted to form strands and bonds which comprises separating said bonds, corrugating said sheet transversely of the slits therein to bring transverse rows and bonds at the crests and depressions formed by corrugating said sheet, substantially continuously advancing said sheet and progressively forcing the bonds of each transverse row at said crests and depressions away from each other to open said slits to desired width, and flattening said sheet to bring said bonds and strands into substantially the same plane.

34. The method of expanding a sheet of metal slitted to form strands and bonds which comprises separating said bonds, corrugating said sheet transversely of the slits therein to bring alternate transverse rows of bonds at the crests and the intermediate rows of bonds at the depressions caused by corrugating said sheet, gradually and progressively forcing the bonds in each row away from each other to open said slits to desired size, and flattening said sheet to bring said bonds and strands into substantially the same plane.

35. The method of expanding a sheet of metal slitted to form strands and bonds which comprises separating said bonds to produce a partially expanded sheet having the strands and bonds thereof in substantially the same plane, corrugating said sheet transversely of the slits therein to bring alternate transverse rows of bonds at the crests and the intermediate rows of bonds at the depressions caused by corrugating said sheet, gradually and progressively forcing the bonds of each row away from adjacent bonds to open said slits to desired size, and flattening said sheet to bring said bonds and strands into substantially the same plane.

36. The method of expanding a sheet of metal slitted to form strands and bonds which comprises separating said bonds to produce a partially expanded sheet having the strands and bonds thereof in substantially the same plane, corrugating said sheet transversely of the slits therein to bring alternate transverse rows of bonds at the crests and the intermediate rows of bonds at the depressions of said corrugations, gradually and progressively forcing the bonds in each row simultaneously away from adjacent bonds while longitudinally advancing said sheet to progressively open said slits to desired width, and flattening said sheet to bring said bonds and strands into substantially the same plane.

37. The method of expanding a sheet of metal slitted to form strands and bonds which comprises separating said bonds to produce a partially expanded sheet having the strands and bonds thereof in substantially the same plane, corrugating said sheet transversely of the slits therein to bring alternate transverse rows of bonds at the crests and the intermediate rows of bonds at the depressions caused by corrugating said sheet, gradually and progressively forcing said bonds in each row simultaneously away from each other by longitudinally advancing said sheet between gradually diverging guides to open said slits to desired width, and flattening said sheet to bring said bonds and strands into substantially the same plane.

38. Apparatus for expanding sheet material comprising means for slitting the material and providing it with a plurality of series of individually separated offset portions, some of said series being spaced a substantial distance from the side edges of the sheet, means for causing the sheet to travel, and means for causing pressure to be exerted substantially laterally with respect to the sheet directly on the offset portions of said plurality of series while the sheet is traveling to cause them to travel in laterally diverging directions to expand the slitted material.

39. Apparatus for expanding sheet material comprising means for slitting the material and providing it with a plurality of series of individually separated offset portions having cut edges, some of said series being spaced a substantial distance from the side edges of the sheet, means for causing the sheet to travel, means for causing lateral pressure to be exerted on the cut edges of said plurality of series while the sheet is traveling to cause them to travel in laterally diverging directions to expand the slitted material.

40. Apparatus for expanding sheet material comprising means for slitting the material and providing it with a plurality of series of individually separated offset longitudinally aligned portions, some of said series being spaced a substantial distance from the side edges of the sheet, means for causing the sheet to travel, and means for causing pressure to be exerted substantially laterally with respect to the sheet directly on the offset portions of said plurality of series while the sheet is traveling to cause them to travel in laterally diverging directions to expand the slitted material.

41. Apparatus for expanding sheet material comprising means for slitting and corrugating the sheet to provide it with a plurality of series of individually separated offset portions, some of said series being spaced a substantial distance from the side edges of the sheet, and means for causing pressure to be exerted on said plurality of series to cause them to travel in diverging directions to expand the slitted material.

42. Apparatus for expanding sheet material comprising means for slitting and corrugating the material to provide it with a plurality of series of individually separated offset portions having cut edges, some of said series being spaced a substantial distance from the side edges of the sheet, and means for causing lateral pressure to be exerted on the cut edges of said plurality of series to cause them to travel in diverging directions to expand the slitted material.

43. Apparatus for expanding a sheet of metal comprising means for slitting the sheet to form strands and bonds, means for corrugating the sheet transversely on the slits therein, so that some of the bonds lie in one plane and others lie in another plane spaced from said first plane, means for separating said bonds by lateral movement in their respective planes to form openings of the desired size, and means for flattening the expanded sheet to remove the corrugations.

44. Apparatus for expanding a sheet of metal comprising means for slitting the sheet to form strands and bonds, means for separating the bonds, means for corrugating the sheet transversely of the slits therein, means for further separating the bonds to form openings of the desired size, and means for flattening the expanded sheet to remove the corrugations.

45. Apparatus for expanding a sheet of metal comprising means for slitting the sheet to form strands and bonds, means for corrugating the sheet transversely of the slits therein, means for gradually separating the strands and bonds transversely at various places throughout the width of the sheet to open the slits to desired size, and means for flattening the sheet to bring the strands and bonds into substantially the same plane.

46. Apparatus for expanding a sheet of metal comprising means for slitting the sheet to form strands and bonds, means for separating the bonds, means for corrugating the sheet transversely of the slits therein, means for further separating the strands and bonds transversely comprising a plurality of spaced diverging expanding guiding means through which the sheet is passed to progressively open the slits to desired size, and means for flattening the sheets to bring the strands and bonds into substantially the same plane.

47. Apparatus for expanding a sheet of metal comprising means for slitting the sheet to form strands and bonds, means for advancing the sheet substantially continuously, means for corrugating the sheet transversely of the slits therein, so that some of the bonds lie in one plane and others lie in another plane spaced from said first plane, means for gradually separating the bonds by lateral movement in their respective planes to form openings of desired size, and means for flattening the sheet to remove the corrugations.

48. Apparatus for expanding a sheet of metal comprising means for slitting the sheet to form strands and bonds, means for advancing the sheet substantially continuously, means for separating the bonds, means for corrugating the sheet transversely of the slits therein, means for gradually separating the bonds to form openings of desired size, and means for flattening the sheet to remove the corrugations.

49. Apparatus for expanding a sheet of metal comprising means for slitting the sheet to form strands and bonds, means for separating the bonds, means for corrugating the sheet transversely of the slits therein to bring transverse rows of bonds at the crests and depressions formed by corrugating said sheet, means for advancing the sheet substantially continuously and progressively forcing the bonds of each transverse row at said crests and depressions away from each other to open said slits to the desired width, and means for flattening the sheet to bring the bonds and strands into substantially the same plane.

50. Apparatus for expanding a sheet of metal comprising means for slitting the sheet to form strands and bonds, means for separating the bonds to produce a partially expanded sheet having the strands and bonds thereof in substantially the same plane, means for corrugating the sheet transversely of the slits therein to bring alternate transverse rows of bonds at the crests and intermediate rows of bonds at the depressions of said corrugations, means for gradually and progressively forcing the bonds in each row simultaneously away from adjacent bonds while longitudinally advancing the sheet to progressively open said slits to desired width, and means for flattening the sheet to bring the bonds and strands into substantially the same plane.

51. Apparatus for expanding a sheet of metal comprising means for slitting the sheet to form strands and bonds, means for separating the bonds to produce a partially expanded sheet having the strands and bonds thereof in substantially the same plane, means for corrugating the sheet transversely of the slits therein to bring alternate transverse rows of bonds at the crests and the intermediate rows of bonds at the depressions caused by corrugating said sheet, means for gradually and progressively forcing the bonds in each row simultaneously away from each other comprising means for longitudinally advancing the sheet between gradually diverging guides to open the slits to the desired width, and means for flattening the sheet to bring the bonds and strands into substantially the same plane.

52. Apparatus for expanding a sheet of metal comprising means for slitting the sheet to form strands and bonds, means for separating the bonds, means for corrugating the sheet transversely of the slits therein to bring transverse rows of bonds at the crests and depressions formed by corrugating said sheet and to form on both sides of the sheet longitudinally extending passageways V-shaped in cross section along the cut edges of the strands, and means for increasing the divergence of said V-shaped cross sections to further expand the sheet.

53. Apparatus for expanding a sheet of metal comprising means for slitting the sheet to form strands and bonds, means for separating the bonds, means for corrugating the sheet transversely of the slits therein to bring transverse rows of bonds at the crests and depressions formed by corrugating said sheet and to form on both sides of the sheet longitudinally extending passageways V-shaped in cross section along the cut edges of the strands, means for increasing the divergence of said V-shaped cross sections to further expand the sheet, and means for flattening the sheet to bring the strands and bonds into the same plane.

MICHAEL G. VASS.